July 6, 1926.
L. E. TUCKER
1,591,582
TRANSMISSION BAND LINING
Filed March 2, 1925
Fig. 2.
Fig. 1.
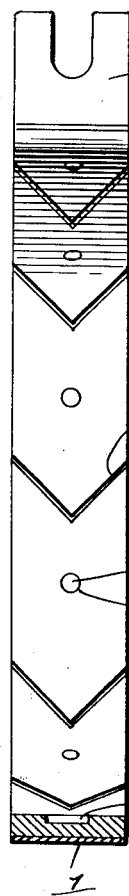
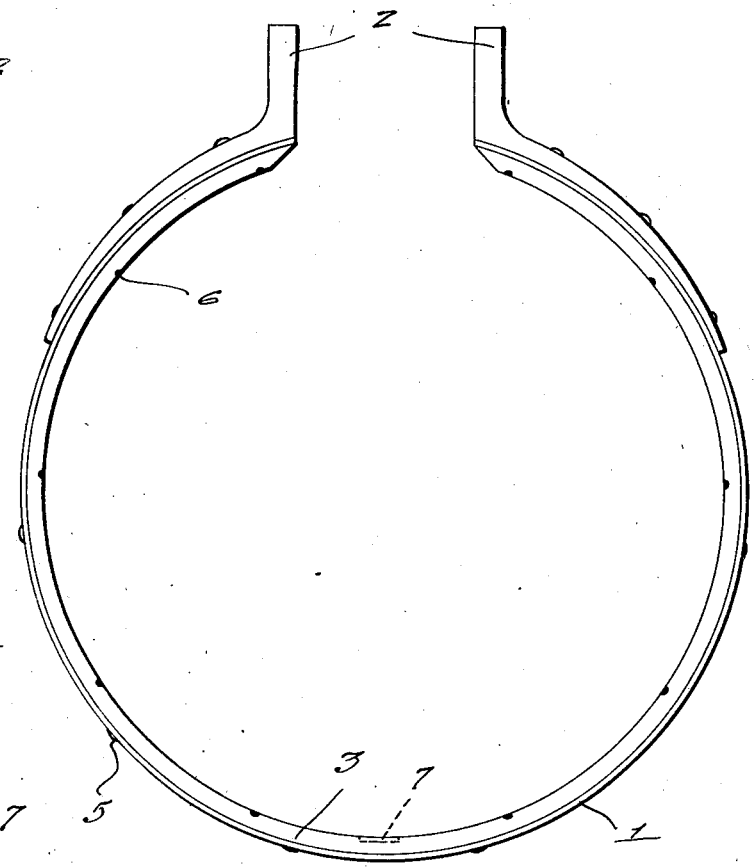
Inventor
L. E. Tucker
By Clarence A. O'Brien
Attorney Patented July 6, 1926.

1,591,582

UNITED STATES PATENT OFFICE.

LYNN E. TUCKER, OF JEROME, ARIZONA.

TRANSMISSION-BAND LINING.

Application filed March 2, 1925. Serial No. 12,585.

The present invention relates to an improved transmission band lining particularly designed for use on Ford automobiles to take the place of the woven lining which is at present used.

The principal object of the invention is to provide a lining formed of wood which will prevent the band from tattering as occurs with the woven linings now in use.

Another important object of the invention is to provide a lining, the inner face of which is provided with grooves for receiving oil sufficiently to prevent the bands from sticking, which as is well known, is the main cause of the obnoxious tattering.

Another very important object of the invention is to provide a lining which may be cheaply manufactured and which will be strong and durable and one which may be easily installed in place of the ordinary woven lining.

In the drawing:—

Figure 1 is an end elevation of a Ford transmission band showing my improved lining associated therewith, and Fig. 2 is a vertical section through the band as shown in Fig. 1.

Referring to the drawing in detail, it will be seen that 1 designates the conventional form of transmission band which is now in use in Ford automobiles, this band being of the split ring type having the operating lugs 2 thereon which may be moved toward each other for contracting the band. My improved lining is designated by the numeral 3 and is formed of wood being cut to fit the interior of the band 1 in place of the woven lining now in common use. This improved lining 3 will be constructed with openings 4 adapted to normally register with similar openings in the band in order that the usual rivets or like fastening elements 5 may be utilized for fixing the lining upon the interior of the band.

My improved wooden lining is provided on its interior surface with V-shaped grooves 6, the apexes of which are alined with the medium dimension of the lining. These grooves extend out to the edges of the lining as is clearly indicated in Fig. 1. An oil pocket or circular recess 7 is provided on the interior surface of the lining at its center as is indicated to advantage in dotted lines in Fig. 1. These oil grooves and the oil pocket will prevent the band from tattering as the oil is a transmission which will be afforded a means of access to the interior of the band.

These linings have been tried for a considerable length of time in driving in a mountainous country where excessive wear is encountered and has been found to outlast the life of the ordinary woven lining 35.

It will be apparent from the foregoing that I have devised an improved wooden lining for transmission bands which may be easily substituted for the ordinary woven lining and which will be efficient and reliable in operation, strong, durable. and well adapted to the purpose for which it is designed.

It will further be apparent that an efficient means has been provided whereby the oil in the transmission case may obtain access to the interior of the band to aid in preventing the obnoxious tattering which is common in the use of the ordinary woven linings.

The present embodiment of the invention has been disclosed merely by way of example and attains all of the features of advantage enumerated as desirable in the statement of the invention and the above description, but it is desired to point out that numerous changes in the details of construction may be resorted to without departing from the spirit or scope of the invention as hereinafter claimed or sacrificing any of its advantages.

Having thus described my invention, what I claim as new is:—

1. A lining for transmission bands provided on its interior surface with oil grooves, said grooves being V-shaped and having their apexes alined with the medium dimensions of the lining.

2. A lining for transmission bands provided on its interior surface with oil grooves, said grooves being V-shaped and having their apexes alined with the medium dimensions of the lining, said lining provided with an interiorly centrally located oil pocket.

In testimony whereof I affix my signature.

LYNN E. TUCKER.